United States Patent
Juan

(10) Patent No.: US 6,311,805 B1
(45) Date of Patent: Nov. 6, 2001

(54) BALANCED BRAKING SYSTEM FOR A BICYCLE

(76) Inventor: Chih-Chen Juan, No. 278, Lan Tan, Tung-Yang, Hsinchun Chiayi City (TW)

(*) Notice: Subject to any disclaimer, the term of this patent is extended or adjusted under 35 U.S.C. 154(b) by 0 days.

(21) Appl. No.: 09/505,480

(22) Filed: Feb. 16, 2000

(51) Int. Cl.[7] .................................................. B62L 1/06
(52) U.S. Cl. ........................................ 188/24.16; 188/2 D
(58) Field of Search ............................ 188/24.14, 24.15, 188/24.16, 2 D

(56) References Cited

U.S. PATENT DOCUMENTS

| | | | |
|---|---|---|---|
| 3,942,609 | * 3/1976 | Hill | 188/24.16 |
| 4,480,720 | * 11/1984 | Shimano | 188/24.16 |
| 5,339,929 | * 8/1994 | Chern | 188/24.16 |
| 5,431,255 | * 7/1995 | Tsuchie | 188/24.16 |
| 5,927,442 | * 7/1999 | Liao | 188/24.16 |
| 6,186,282 | * 2/2001 | Juan | 188/24.16 |

* cited by examiner

Primary Examiner—Matthew C. Graham
(74) Attorney, Agent, or Firm—Pro-Techtor International Services

(57) ABSTRACT

A balanced braking system to be used on a bicycle with a front brake and a rear brake, the balanced braking system comprising: a connecting unit and a secondary cable. The connecting unit is driven by primary cables, carrying a roll. The secondary cable has two ends that connect the front and rear brakes and a middle part that runs around the roll, turning the roll with little friction when shifting. When the primary cables are pulled on, the secondary cable is moved aside by the roll, in turn pulling on the front and rear brakes. Any different forces on the front brake and the rear brake are compensated by the secondary cable shifting with little friction.

6 Claims, 4 Drawing Sheets

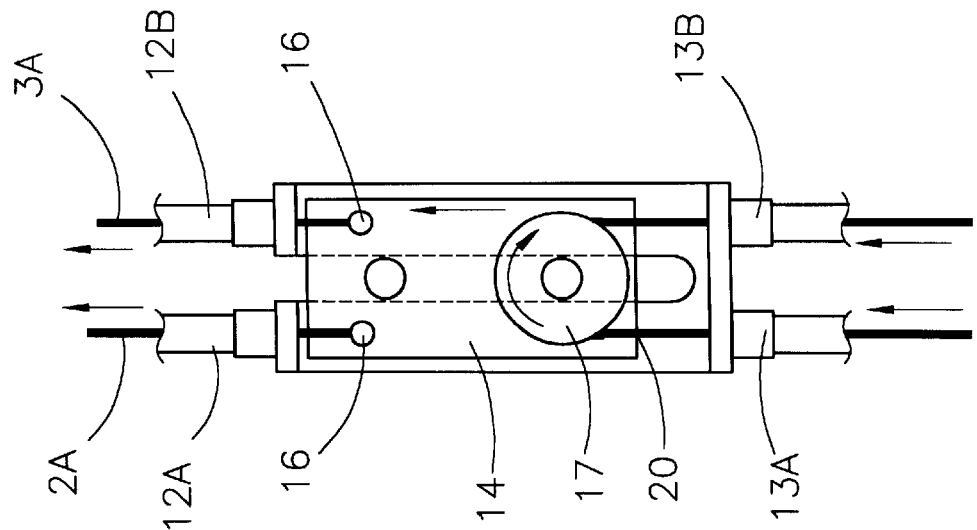
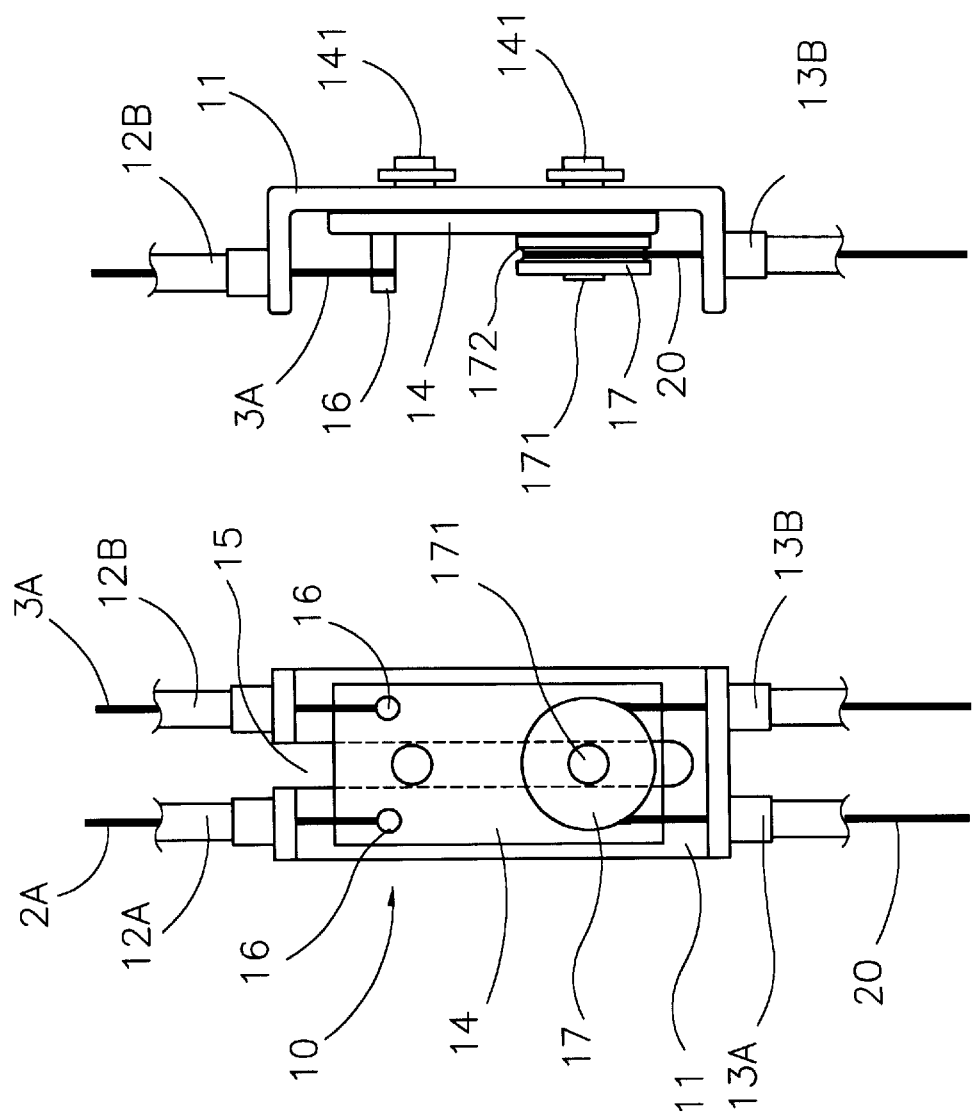

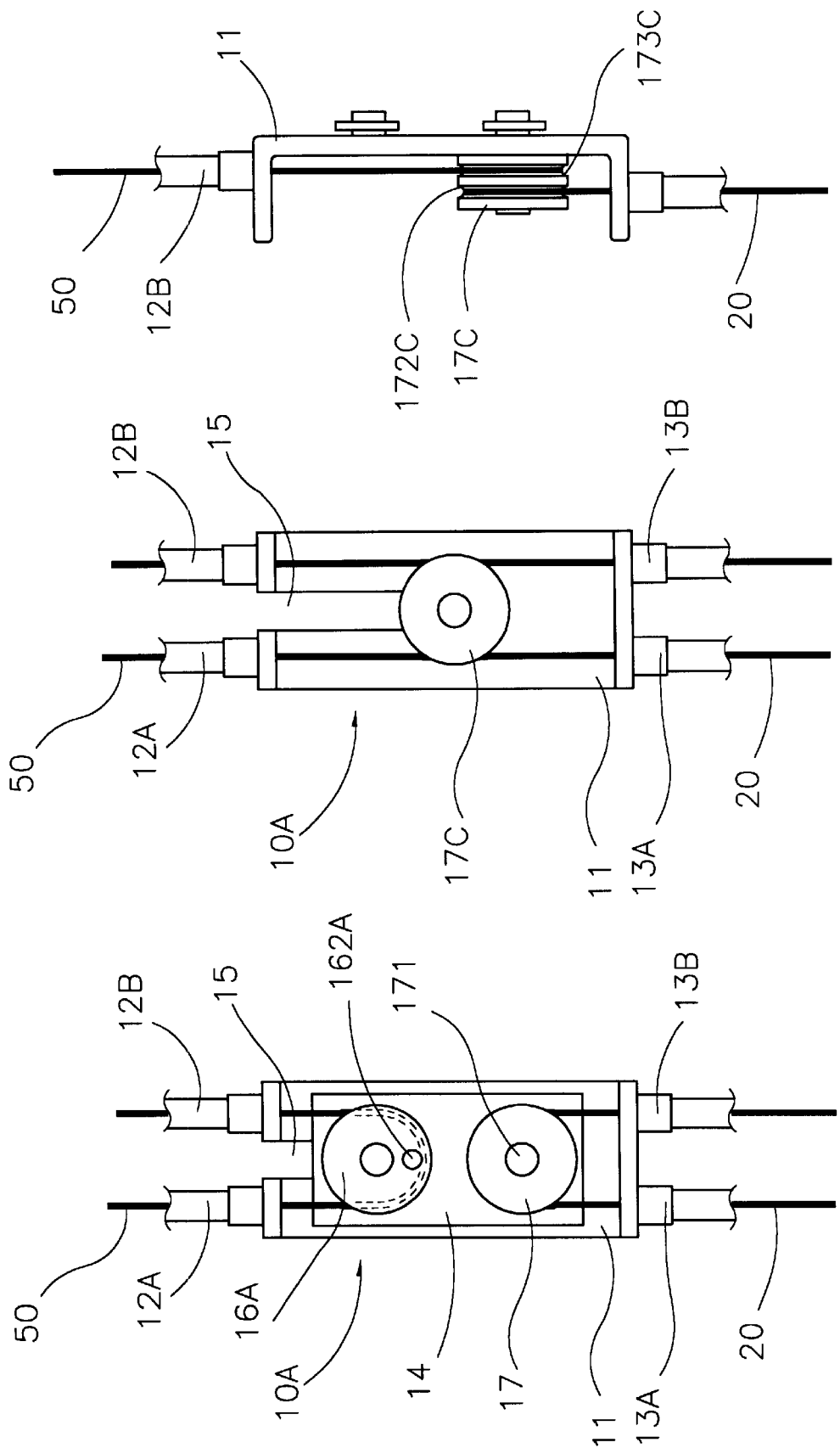

BALANCED BRAKING SYSTEM FOR A BICYCLE

BACKGROUND OF THE INVENTION

1. Field of the Invention

The present invention relates to a balanced braking system for a bicycle, particularly to a balanced braking system, which applies a braking force simultaneously to the front and rear wheels of a bicycle for better stability and safety.

2. Description of Related Art

A conventional braking system for a bicycle mostly has two independent brakes for the front and rear wheels, which are driven by two independent cables and operated by a left handle and a right handle on a handlebar. During braking, the two brakes generally are not operated at exactly the same time or with equal force. There is no way exactly to apply equal braking forces simultaneously on the front and rear wheels. One of the wheels may block, while the other is still rolling. Thus the braking effect is reduced, the bicycle possibly starts to skid or even falls over.

To overcome this problem, in conventional art balanced brake designs have been disclosed, like in Taiwan patents nos. 130002 and 127550.

A conventional balanced brake system generally uses a single cable for driving a connecting device that simultaneously acts on the front and rear brakes for braking of the front and rear wheels at the same time. Since the connecting device drives the front and rear brakes via separate cables, independent adjustments of cable tensions are needed for controlling front and rear braking effects.

However, the bicycle is not completely stable when rolling. The bicycle has a frame that undergoes torsion, which affects the front and wheel brakes, particularly positioning and adjusting thereof. Therefore, effective balanced braking is not achievable.

SUMMARY OF THE INVENTION

It is the main object of the present invention to provide a balanced braking system for a bicycle, which has an automatical balancing capability and effectively and simultaneously acts on the front and rear wheels of a bicycle.

Another object of the present invention is to provide a balanced braking system for a bicycle, which applies balanced braking forces on the front and rear wheels for enhancing stability during braking.

A further object of the present invention is to provide a balanced braking system for a bicycle, which is controlled by either of the left and right hands for enhanced reliability.

The present invention can be more fully understood by reference to the following description and accompanying drawings.

BRIEF DESCRIPTION OF THE DRAWINGS

FIG. 2 is a front view of the present invention in the first embodiment.

FIG. 3 is a side view of the present invention in the first embodiment.

FIG. 4 is a schematic illustration of the movement of the present invention in the first embodiment.

FIG. 8 is a front view of the present invention in the third embodiment.

FIG. 9 is a front view of the present invention in the fourth embodiment.

FIG. 10 is a side view of the present invention in the fourth embodiment.

DETAILED DESCRIPTION OF THE PREFERRED EMBODIMENTS

Figure 1:
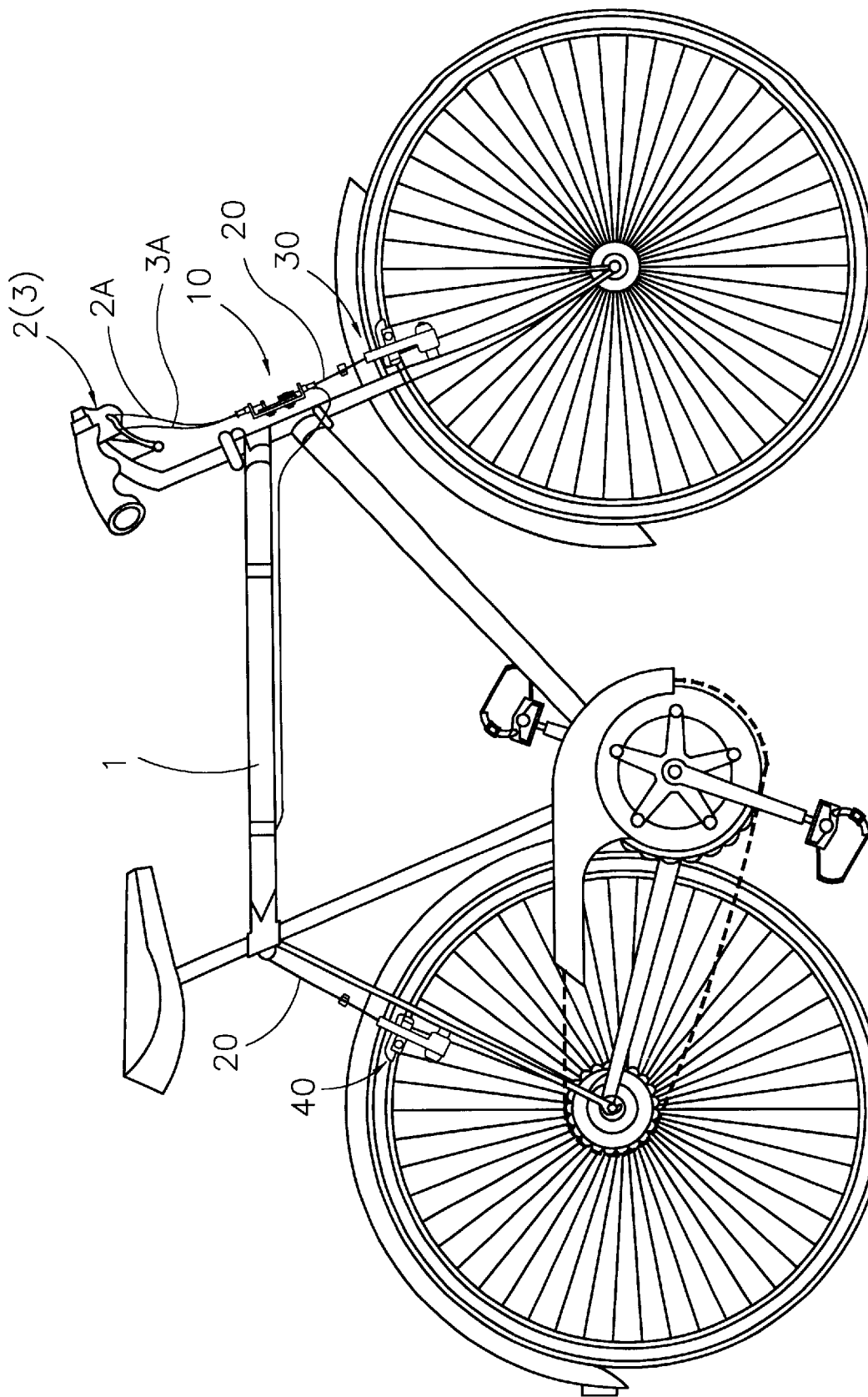
FIG. 1 is a schematic illustration of the balanced braking system of the present invention in the first embodiment in conjunction with a bicycle.

The balanced braking system of the present invention is used in conjunction with a bicycle 1, having a frame, a front wheel with a front brake 30, a rear wheel with a rear brake 40, a left handle 2 for pulling a left primary cable 2A, and a right handle 3 for pulling aright primary cable 3A. As shown in FIG. 1, the balanced braking system of the present invention in a first embodiment mainly comprises: a connecting unit 10, mounted on the frame of the bicycle; and a secondary cable 20, having two ends which lead to the front and rear brakes of the bicycle, driving the front and rear brakes 30, 40.

Referring to FIGS. 2 and 3, the connecting unit 10 comprises: a main body 11, having an upper end and a lower end; two guiding tubes 12A, 12B on the upper end of the main body 11 for taking in the primary cables 2A, 3A; two guiding tubes 13A, 13B on the lower end of the main body 11 for taking in the secondary cable 20; a gliding plate 14 with an upper end and a lower end; a gliding groove 15 along a vertical direction; two fixing elements 16 on the upper end of the gliding plate 14; and a roll 17 on the lower end of the gliding plate 14.

The gliding plate 14 is held by two bolts on the gliding groove 15 and is glidingly movable within the main body 11 in the vertical direction. The two fixing elements 16 fasten the primary cables 2A, 3A, which are connected to the left and right handles 2, 3, to the gliding plate 14. The roll 17 is held on the gliding plate 14 by a bolt 171 and has a peripheral groove 172.

As shown in FIG. 3, the secondary cable is laid around the roll 17, guided by the peripheral groove 172 thereof. As shown in FIG. 1, the secondary cable 20 has two ends that are connected to the front and rear brakes 30, 40, respectively. As shown in FIG. 4, when a user operates the right and left handles 2, 3, the primary cables 2A, 3A are pulled on, lifting the gliding plate 14 along with the roll 17. The roll 17, when moving upward, in turn pulls the secondary cable 20 aside, resulting in a front braking force on the front brake 30 and a rear braking force on the rear brake 40.

The main characteristic of the present invention is that the secondary cable 20 serves as a common cable for the front and rear brakes 30, 40. When the roll 17 moves upward, pulling on the secondary cable 20, any difference in the front and rear braking forces is compensated by the secondary cable 20 running over the roll 17 until the front and rear braking forces are equal. In the same way, if the front and rear brakes 30, 40 do not start to grip the wheels of the bicycle at the same time, the secondary cable 20 shifts until the front and rear brakes 30, 40 work symmetrically.

Therefore, independent of asymmetric operating of the right and left handles 2, 3, the connecting unit 10 ensures that both the front brake 30 and the rear brake 40 work simultaneously with equal forces. Thus a uniform braking effect is achieved, resulting in a shortened braking distance and higher stability.

Operating either the left handle 2 or the right handle 3 still leads to symmetric braking of the front and rear brakes 30, 40 via the connecting unit 10. Thus riding the bicycle is made safer.

Figure 6:
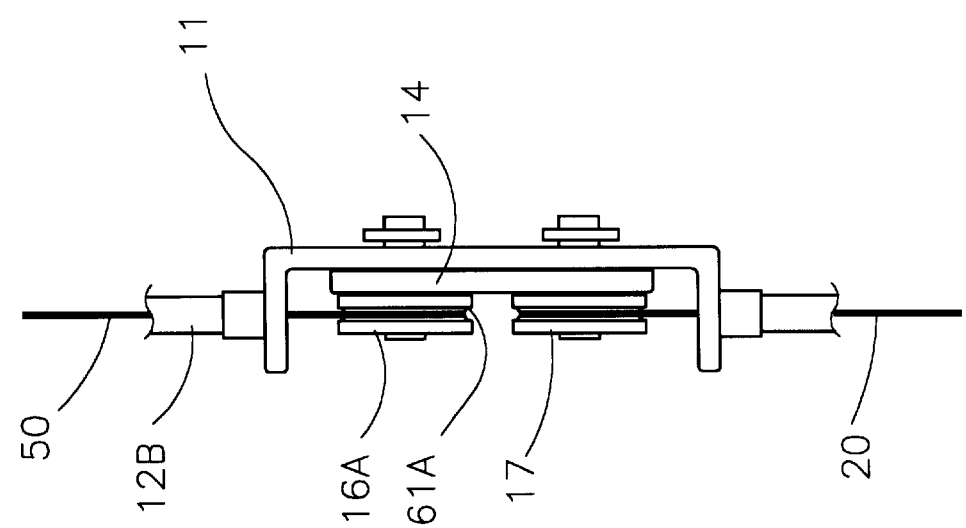
FIG. 6 is a side view of the present invention in the second embodiment.
Figure 5:
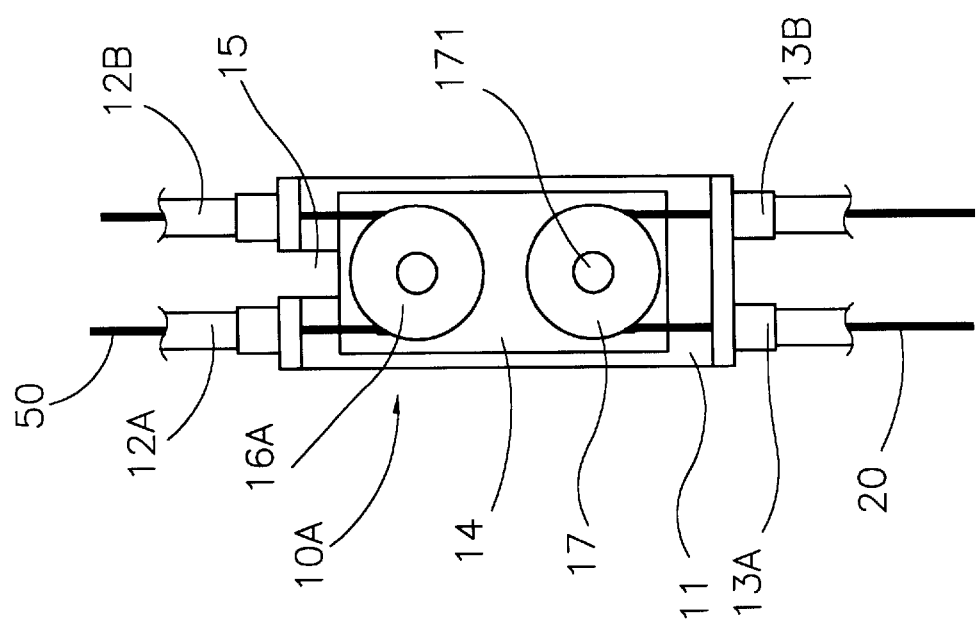
FIG. 5 is a front view of the present invention in the second embodiment.

Referring to FIGS. 5 and 6, the present invention in a second embodiment works in conjunction with a single primary cable 50 and has a connecting unit 10A with a connecting element 16A. The primary cable 50 has two ends which are connected with the right and left handles 2, 3, respectively. The connecting element 16A is a roll which is mounted on the gliding plate 14, having a peripheral groove 161A. The primary cable 50, starting at the left handle 2, passes through the guiding tube 12A, runs around the connecting element 16A, guided by the peripheral groove 161A thereof, and again passes through the guiding tube 12B to end at the right handle 3.

Figure 7:
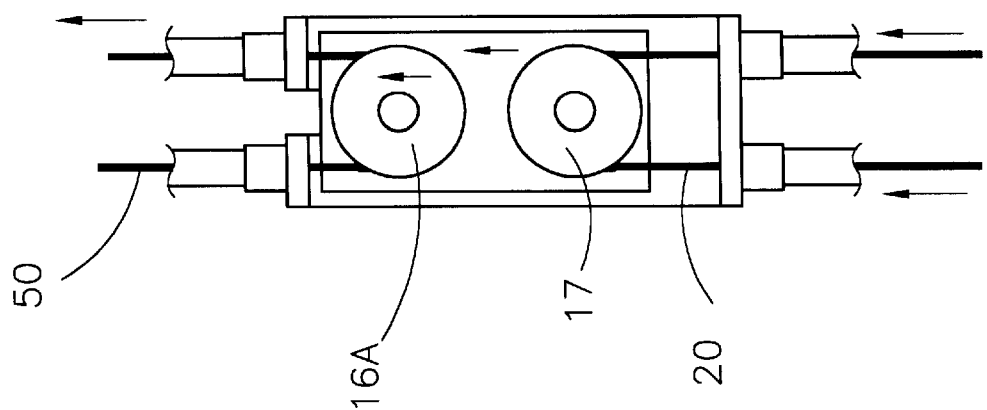
FIG. 7 is a schematic illustration of the movement of the present invention in the second embodiment.

As shown in FIG. 7, the main characteristic of the present invention in the second embodiment is the connecting element 16A being a roll. When the primary cable 50 is pulled on, the connecting element 16A is moved only half the distance thereof, resulting in a better braking effect.

Referring to FIG. 8, the present invention in a third embodiment has an additional fixing element 162A, e.g. a nail, on the connecting element 16A of the second embodiment. The fixing element 162A links the primary cable 50 and the connecting element 16A. Thus a braking effect like in the first embodiment is achieved.

Referring to FIGS. 9 and 10, the present invention in a third embodiment has a roll 17C with a peripheral groove 172C and a peripheral groove 173C. The primary cable 50 and the secondary cable 20 run over the roll 17C, guided by the peripheral grooves 173C and 172C, respectively. By connecting the primary cable 50 with the roll 17C, the primary cable acts directly on the roll 17C.

The present invention provides balanced braking of the front and rear brakes of the bicycle with uniform force. Therefore, braking distance and braking time are reduced, and stability and safety are enhanced.

While the invention has been described with reference to preferred embodiments thereof, it is to be understood that modifications or variations may be easily made without departing from the spirit of this invention which is defined by the appended claims.

What is claimed is:

1. A balanced braking system for a bicycle, said bicycle comprising a frame, a front brake and a rear brake, said balanced braking system comprising:

at least one primary cable,
a connecting unit connected to said at least one primary cable, and
a secondary cable having two ends; wherein
said connecting unit includes at least one roller,
a first end of said secondary cable is connected to said front brake and a second end of said secondary cable is connected to said rear brake, a central portion of said secondary cable passes over said roller of said connecting unit; such that
when tension is applied to said at least one primary cable, said at least one primary cable moves said connecting unit and in turn said secondary cable, thereby causing said secondary cable to apply force equally and simultaneously to said front brake and said rear brake.

2. A balanced braking system according to claim 1, wherein:

said connecting unit further comprises a main body and a gliding plate movable within said main body, said at least one primary cable being affixed to said gliding plate by means of a connecting element; such that
when tension is applied to said at least one primary cable, said at least one primary cable moves said gliding plate and in turn said secondary cable, thereby causing said secondary cable to apply force equally and simultaneously to said front brake and said rear brake.

3. A balanced braking system according to claim 2, wherein:

said connecting element is a second roller, a central portion of said primary cable passing under said second roller such that said second roller is moved when tension is applied to said at least one primary cable.

4. A balanced braking system according to claim 3, wherein:

a fixing element connects said at least one primary cable to said connecting element.

5. A balanced braking system according to claim 2, wherein:

said braking system comprises two primary cables, each of said two primary cables connecting an operating lever on said bicycle to said connecting element.

6. A balanced braking system according to claim 2, wherein:

said connecting element is mounted on said roller, such that said roller is directly driven by said at least one primary cable.

* * * * *